United States Patent Office 3,121,710
Patented Feb. 18, 1964

3,121,710
QUATERNIZED MONOAZO DYES CONTAINING A 6-HYDROXY-INDAZOLE RADICAL
Robert Frédéric Michel Sureau, Enghien-les-Bains, and Jean Léon Adrien Rollet, Eaubonne, France, assignors to Compagnie Française des Matieres Colorantes, Paris, France, a French company
No Drawing. Filed Oct. 2, 1959, Ser. No. 843,913
Claims priority, application France Oct. 2, 1958
7 Claims. (Cl. 260—146)

The present invention concerns new basic azo dyestuffs, a process for their preparation and the coloration of fibres therewith. It particularly relates to basic monoazo dyestuffs of the general formula:

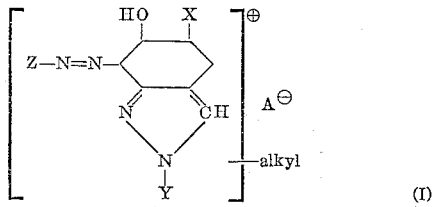

(I)

to their preparation and their application to the dyeing of polyacrylic fibres. In this formula, X represents a hydrogen or chlorine atom, Y represents a hydrogen atom or an alkyl radical, A represents a mineral or a strong organic anionic radical and Z represents the residue of a diazotizable primary aromatic or heterocyclic amine. The latter residue may be substituted by halogen atoms and/or by non-solubilising groups such as nitro, acylamino, trifluoromethyl, alkyl, alkoxy, mono- or di-alkylamino, sulphonamido or carbonamido groups. The strong organic anionic radical may be for example the chloroacetyl or trichloroacetyl radical.

The dyestuffs of Formula I may be obtained for example by the action, in an organic solvent medium, of an alkyl halide, sulphate or arylsulphonate on a dyestuff of the formula:

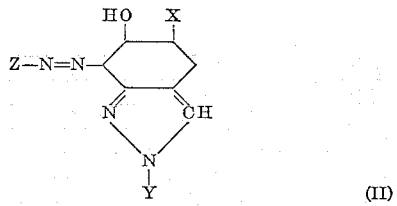

(II)

in which X, Y and Z have the same significance as above, dissolving the precipitate formed in hot water, filtering and precipitating the quaternary dyestuff of the Formula I by means of salt or in the form of a product of addition of the compound of Formula I with zinc chloride, by means of zinc chloride and salt.

It has been found that the dyestuffs of Formula I or their addition compounds with zinc chloride are generally very soluble in water and have an excellent affinity for tanned cotton, silk, leather and polyacrylic fibres. The colours obtained, in the range of yellows, oranges and reds, are generally endowed with excellent fastness, especially to washing and to light.

The invention will be more clearly understood by reference to the following examples which are purely illustrative and in which the parts are by weight unless the contrary is indicated.

Example 1

10.7 parts of orthotoluidine are dissolved in 200 parts of water by the addition of 25 parts by volume of 30% hydrochloric acid. Diazotization is effected at about 5° C., with a solution of 6.9 parts of sodium nitrite in 50 parts of water. The solution of the diazo compound is then added to a solution of 13.4 parts of 6-hydroxy-indazole in 500 parts of water containing 40 parts by volume of soda lye at 400 g. per litre. The dyestuff rapidly precipitates. After 4 hours' agitation, hydrochloric acid is added until an acid reaction on Congo red paper is obtained, and the mixture is left under agitation for a further half hour. The dyestuff is filtered off, washed with water and dried.

This dyestuff is then dissolved at the boil in 2000 parts of dry chlorobenzene. 4 parts of calcined magnesia are added and then, gradually, a mixture comprising 250 parts of dry chlorobenzene and 50 parts of para-toluenemethyl-sulphonate, and the whole is allowed to boil under reflux for 2 hours. After cooling, the new dyestuff is filtered off, washed with ether and dried. A yellow powder, soluble in water, is obtained, which dyes polyacrylic fibres such as that sold under the registered trademark "Orlon" a bright and full-bodied golden yellow shade, endowed with very good general fastness.

Example 2

15.7 parts of 4-chloro-2-amino-anisole are dissolved in 200 parts of water by the addition of 25 parts by volume of 30% hydrochloric acid, and diazotized at about 5° C., with a solution of 6.9 parts of sodium nitrite in 50 parts of water. The solution of the diazo compound is then added to a solution of 13.4 parts of 6-hydroxy-indazole in 500 parts of water containing 40 parts by volume of soda lye at 400 g. per litre. The dyestuff is precipitated. After 4 hours' agitation, hydrochloric acid is added until an acid reaction on Congo red paper is obtained, and the mixture is again agitated for half an hour. The dyestuff is filtered off, washed with water and dried, and is in the form of an orange powder.

This dyestuff is dissolved at boiling point in 2000 parts of dry chlorobenzene. 4 parts of magnesia are added and then, gradually, a mixture comprising 250 parts of dry chlorobenzene and 25 parts by volume of neutral methyl sulphate, and the whole is allowed to boil under reflux for 2 hours. After cooling, it is filtered to remove the solvent and the dyestuff which has precipitated is dissolved in 1000 parts of fairly hot water in order to purify it. The solution is filtered, and after cooling, 10 parts of zinc chloride are added. The precipitate is washed with a little ice water, drained and dried in an oven at 70° C. The new dyestuff is in the form of a red-brown powder, soluble in water, which dyes "Orlon" an orange shade endowed with very good fastness to light and to washing.

The following table summarises further examples analogous to Examples 1 and 2.

| Example | Diazotized amine | Coupling compound | Shade on polyacrylic Fibres |
|---|---|---|---|
| 3 | aniline | 6-hydroxy-indazole. | yellow. |
| 4 | m-toluidine | do | golden yellow. |
| 5 | p-toluidine | do | Do. |
| 6 | o-anisidine | do | orange. |
| 7 | p-anisidine | do | Do. |
| 8 | o-phenetidine | do | Do. |
| 9 | p-phenetidine | do | Do. |
| 10 | o-nitraniline | do | orange yellow. |
| 11 | m-nitraniline | do | yellow. |
| 12 | p-nitraniline | do | orange. |
| 13 | o-chloraniline | do | golden yellow. |
| 14 | m-chloraniline | do | yellow. |
| 15 | p-chloraniline | do | golden yellow. |
| 16 | 4-chloro-2-aminotoluene | do | Do. |
| 17 | 5-chloro-2-aminotoluene | do | orange yellow. |
| 18 | 6-chloro-2-aminotoluene | do | yellow. |
| 19 | 2,5-dichloro-aniline | do | Do. |
| 20 | 2,5-dimethoxy-aniline | do | Do. |

| Example | Diazotized amine | Coupling compound | Shade on polyacrylic Fibres |
|---|---|---|---|
| 21 | 2,4-dimethyl-aniline | 6-hydroxy-indazole | orange. |
| 22 | 2,5-dimethyl-aniline | do | orange yellow. |
| 23 | m-trifluoromethylaniline | do | yellow. |
| 24 | 4-nitro-2-amino-anisole | do | orange yellow. |
| 25 | 5-nitro-2-amino-anisole | do | orange. |
| 26 | 3-nitro-4-amino-anisole | do | scarlet. |
| 27 | 4-nitro-2-amino-toluene | do | yellow. |
| 28 | 5-nitro-2-amino-toluene | do | golden yellow. |
| 29 | 3-amino-4-methoxy-benzamide | do | yellow. |
| 30 | aniline m-sulphonamide | do | Do. |
| 31 | aniline p-sulphonamide | do | golden yellow. |
| 32 | m-nitraniline | 5-chloro-6-hydroxy-indazole | yellow. |
| 33 | 4-chloro-2-amino-anisole | do | scarlet. |
| 34 | m-nitraniline | 2-methyl-6-hydroxy-indazole | yellow. |

We claim:
1. Monoazo dyestuffs of the general formula:

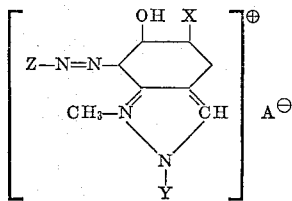

in which X represents a member selected from the group consisting of the hydrogen and chlorine atoms, Y represents a member selected from the group consisting of the hydrogen atom and the methyl radical, Z represents a phenyl radical which may be substituted by members selected from the group consisting of the chlorine atom and the methyl, methoxy, ethoxy, nitro, trifluoromethyl, carbonamido, and sulphonamido radicals, A represents a member selected from the group consistting of the chlorine atom, the monomethylsulphate radical and the p.toluenesulphonate radical.

2. Addition compounds of zinc chloride with monoazo dyestuffs of the general formula:

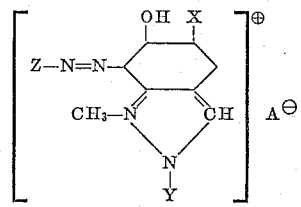

in which X represents a member selected from the group consisting of the hydrogen and chlorine atoms, Y represents a member selected from the group consisting of the hydrogen atom and the methyl radical, Z represents a phenyl radical which may be substituted by members selected from the group consisting of the chlorine atom and the methyl, methoxy, ethoxy, nitro, trifluoromethyl, carbonamido and sulphonamido radicals, A represents a member selected from the group consisting of the chlorine atom, the monomethylsulphate radical and the p.toluenesulphonate radical.

3. Monoazo dyestuff of the general formula given in claim 1 in which Z represents the residue of 4-chloro-2-aminoanisole, X and Y each represent hydrogen atoms, and A represents the monomethyl sulphate radical.

4. Monoazo dyestuff of the general formula given in claim 1 in which Z represents the residue of m-toluidine, X and Y each represent hydrogen atoms, and A represents the monomethyl sulphate radical.

5. Monoazo dyestuff of the general formula given in claim 1 in which Z represents the residue of p-chloraniline, X and Y each represent hydrogen atoms, and A represents the monomethyl sulphate radical.

6. Monoazo dyestuff of the general formula given in claim 1 in which Z represents the residue of 4-chloro-2-amino-toluene, X and Y each represent hydrogen atoms, and A represents the monomethyl sulphate radical.

7. Monoazo dyestuff of the general formula given in claim 1 in which Z represents the residue of 5-chloro-2-amino, toluene, X and Y each represent hydrogen atoms, and A represents the monomethyl sulphate radical.

References Cited in the file of this patent

UNITED STATES PATENTS

| 2,448,870 | Dickey et al. | Sept. 7, 1948 |
| 2,475,506 | Lewis | July 5, 1949 |
| 2,717,823 | Lowe | Sept. 13, 1955 |
| 2,828,301 | Sureau et al. | Mar. 25, 1958 |
| 2,883,373 | Bossard et al. | Apr. 21, 1959 |
| 2,889,315 | Bossard et al. | June 2, 1959 |
| 2,893,816 | Tsang et al. | July 7, 1959 |